March 25, 1930.
C. A. SABBAH
1,752,205
POWER CONVERTING APPARATUS
Filed Oct. 27, 1928     3 Sheets-Sheet 1
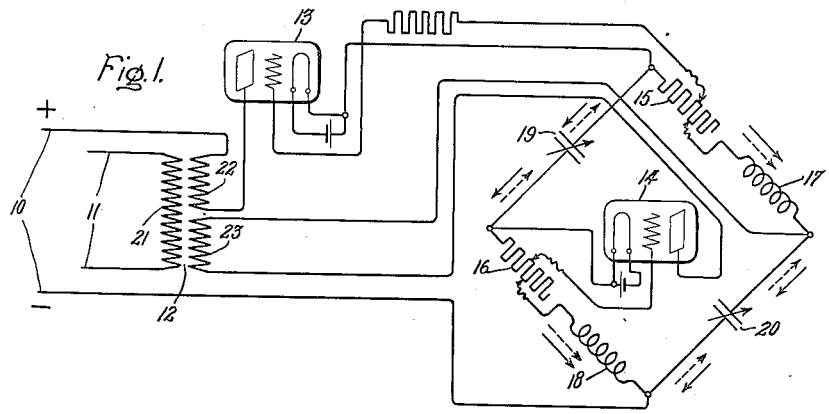
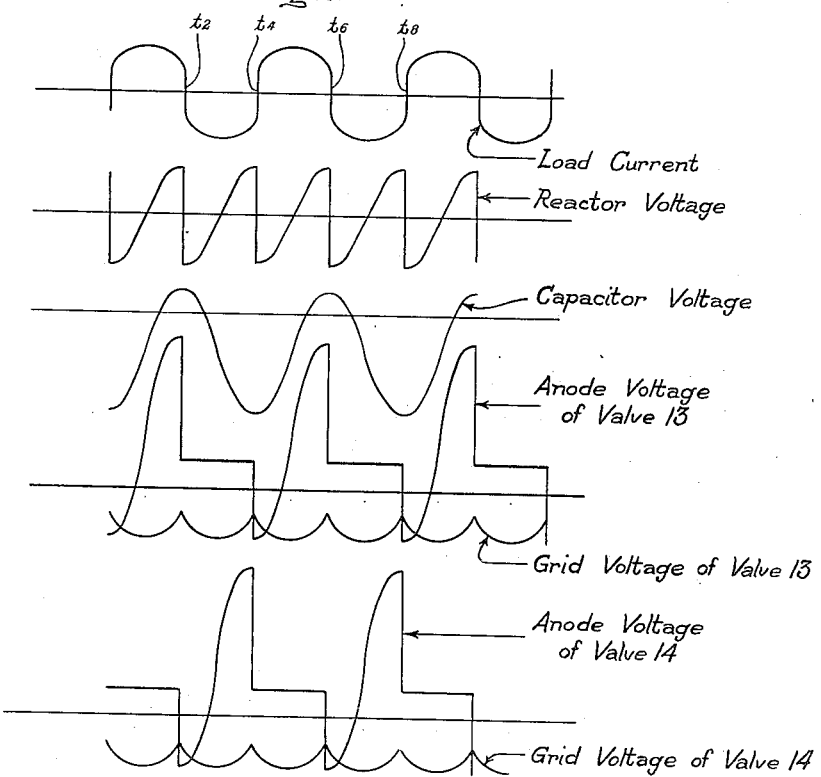
Inventor:
Camil A. Sabbah,
by Charles E. Mullan
His Attorney.

Inventor:
Camil A. Sabbah,
by Charles E. Tullar
His Attorney.

Inventor:
Camil A. Sabbah,
by Charles E. Mullen
His Attorney.

Patented Mar. 25, 1930

1,752,205

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

POWER-CONVERTING APPARATUS

Application filed October 27, 1928. Serial No. 315,577.

My invention relates to power converting apparatus such as that utilized to transmit power between direct and alternating current circuits, and has for its principal object the provision of an improved apparatus of this character, which may be constructed at comparatively low cost and operates with a high degree of efficiency.

Various types of apparatus have been provided in the past for exchanging power between direct and alternating current circuits. Many of these apparatuses can be produced only at considerable cost for the reason that they include a number of transformers and asymmetric conductors or electric valves. In accordance with my invention this difficulty is avoided by the provision of an improved circuit which does not necessarily include more than one transformer nor more than two electric valve elements.

My invention will be better understood from the following description when considered in connection with the accompanying drawings and its scope will be pointed out in the appended claims.

Figure 3:
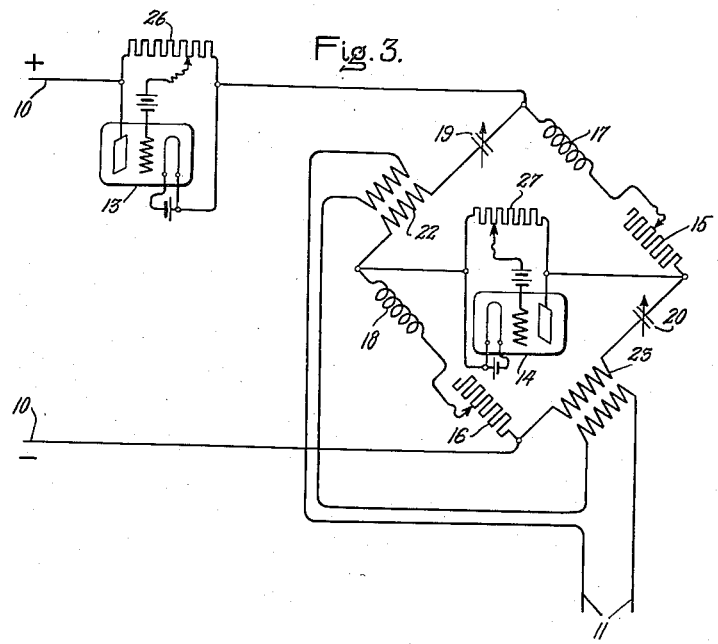
Figure 4:
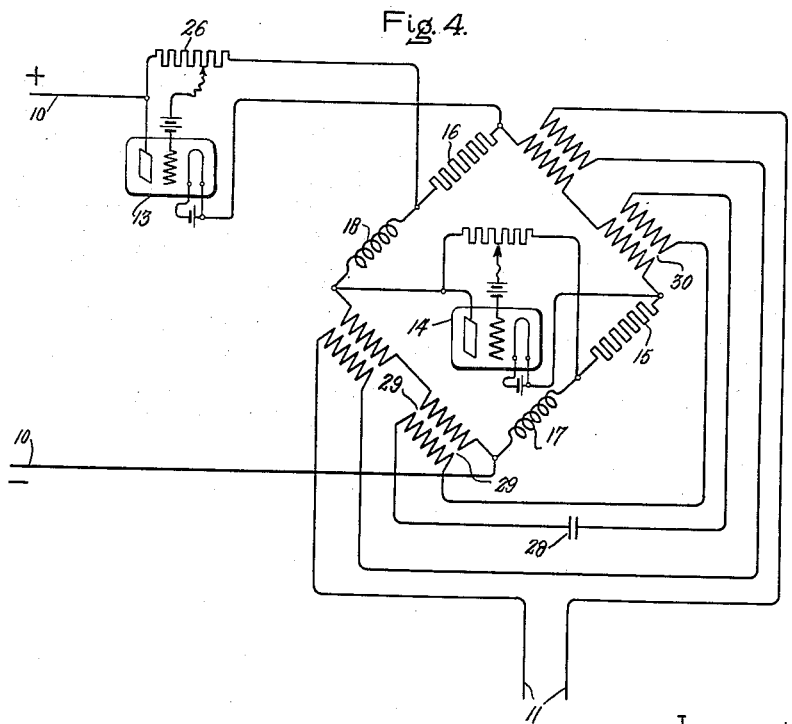
Figure 5:
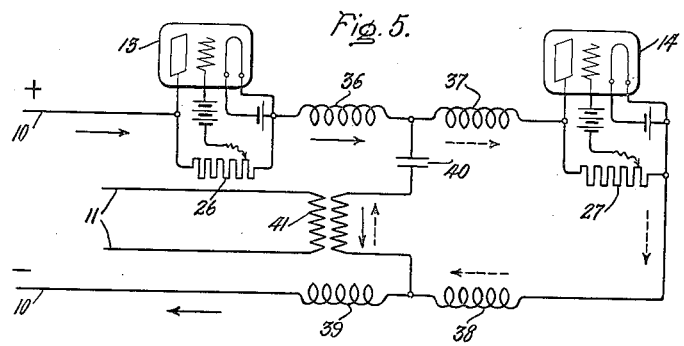
Figure 6:
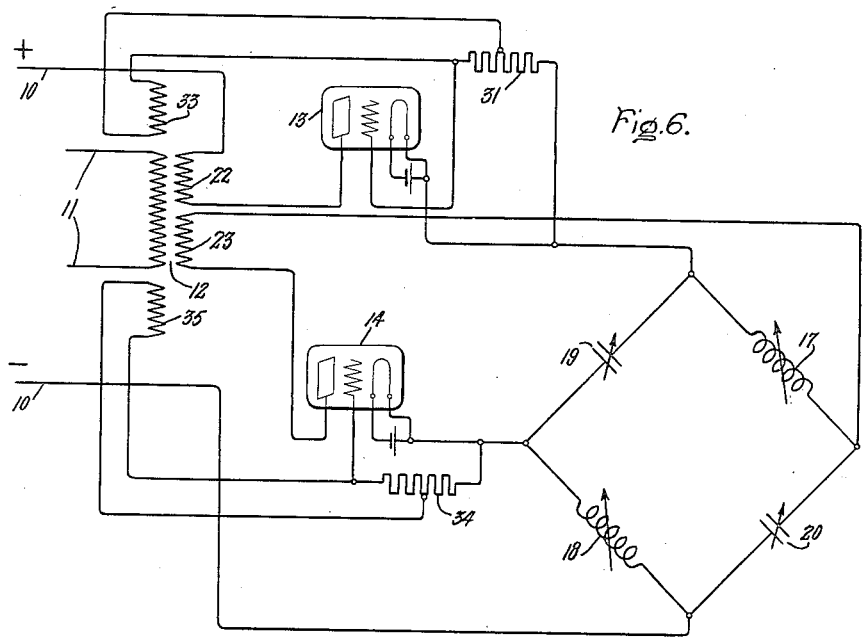
Figure 7:
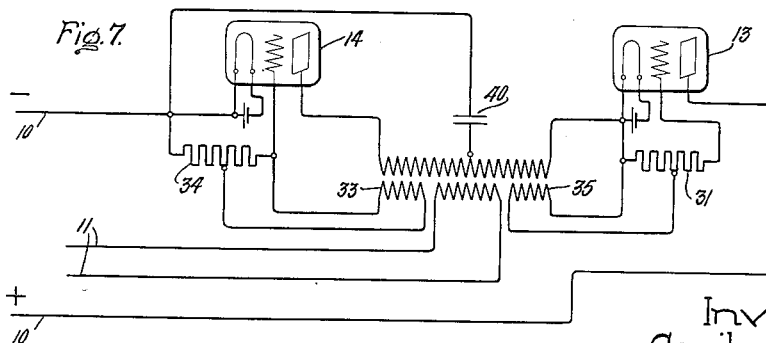

Referring to the drawings, Fig. 1 is a wiring diagram of a power converting apparatus wherein my invention has been embodied; Fig. 2 is an explanatory diagram relating to the operation of this apparatus; Figs. 3, 4 and 6 illustrate different modifications of the apparatus of Fig. 1; and Figs. 5 and 7 illustrate the application of my invention to a type of apparatus different from that of Fig. 1.

As illustrated by Fig. 1, the power converting apparatus includes a direct current circuit 10 and an alternating current circuit 11, which are interconnected through a transformer 12, electric valves 13 and 14 and an oscillatory circuit or monocyclic square including a pair of resistors 15 and 16, a pair of reactors 17 and 18, and a pair of capacitors 19 and 20. The transformer 12 is provided with a winding 21 which may be interconnected with any suitable alternating load circuit and with a pair of windings 22 and 23 which are inductively related to the winding 21. In making the connection of the various parts of the apparatus, the positive terminal of the direct current circuit 10 is connected through the winding 22 and the valve 13 to a terminal at the junction of the capacitor 19 with the resistor 15, the negative terminal of the line 10 is connected directly to a terminal at the junction of the reactor 18 with the capacitor 20, and the winding 23 and the valve 14 are connected in series with one another between a terminal at the junction of the capacitor 19 with the resistor 16 and a terminal at the junction of the reactor 17 with the capacitor 20.

The valves 13 and 14 are preferably of the vapor electric ionization type and are subjected to a negative grid bias potential of a magnitude dependent on the voltage drop of the resistors 15 and 16. The manner in which direct current supplied at the terminals 10 is converted into alternating current delivered at the terminals, 11, will be readily understood upon consideration of Fig. 2. As indicated by the legends of Fig. 2, the various curves respectively represent load current, reactor voltage, capacitor voltage, anode and grid voltages of the valve 13 and anode and grid voltages of the valve 14.

During the time interval $t_2$—$t_4$ when the valve 13 carries current, the valve 14 is subjected to a voltage which is the sum of the reactor and capacitor voltages and increases in magnitude until the instant $t_4$. At this instant, the negative grid bias potential of the valve 14 has decreased to a value which permits the passage of current through the valve 14 and the winding 23. Due to this current, the anode voltage of the valve 13 is reversed, the current of the valve 13 is interrupted, and the negative grid bias voltage of the tube 13 increases in value.

During the time interval $t_4$—$t_6$, current is carried by the valve 14 which is now subjected to an anode voltage dependent on the difference between the reactor and capacitor voltages. At the same time, the valve 13 is subjected to an anode voltage which is dependent on the sum of the reactor and capacitor voltages and which increases until the instant $t_6$ when the negative grid potential has decreased to a value which permits current to start through the valve 13. When this current starts, the valve 14 is subjected to a negative anode voltage, its current is interrupted, and its grid and anode change in a manner to permit opening of the valve 14 and closure of the valve 13 at the instant $t_8$.

The frequency at which current is supplied at the winding 21 is dependent on the characteristics of the valves 13 and 14 and on the adjustment of the grid connections to the resistors 15 and 16. It is well known that valves of the vapor electric type may be so designed that they start to carry current either at zero grid potential or at a predetermined negative or positive grid potential. Assuming that the valves 13 and 14 begin to transmit current at the negative grid potential which exists at the instants $t_2$, $t_4$, $t_6$ etc., it will be apparent that the operating frequency of the line 11 may be varied by including more or less of the resistors 15 and 16 in the respective grid circuits of the valves 13 and 14. Thus if the negative grid bias potential of the valves is increased, the operating frequency of the line 11 is raised and vice versa.

In Fig. 1 the charging currents of the capacitors are indicated by full line arrows and the discharging currents of the capacitors are indicated by the broken line arrows. It will be observed that the charging and discharging currents are transmitted through the resistors and reactors in the same direction, thus producing the pulsating grid potential shown by the curves of Fig. 2.

The transformer windings 22 and 23 may be supplied with current from different parts of the converting apparatus. As indicated by Fig. 3, these windings may be connected to the oscillatory circuit in series with the capacitors 19 and 20 respectively. In this modification of the invention, potential is applied to the grid of the valve 13 through a resistor 25 connected in shunt to this valve, and is applied to the grid of the valve 14 through a similarly connected resistor 27. In the operation of the apparatus it has been found desirable that the resistors 26 and 27 have a high resistance and that the grid potential be sufficiently near the cathode potential to prevent both valves from carrying current at the same time but not near enough to prevent the starting of current through both valves. The proper position of the grid connection on the resistor in each particular case is determined by adjustment. When this position is once determined, the apparatus operates at a frequency which may be changed by adjusting the positions of the grid taps.

As indicated by Fig. 4, the grids of the valves 13 and 14 may be subjected to a potential which is dependent both on the voltage drop of the resistors connected in shunt to the valves and on the voltage drop of the resistors connected in the closed circuit, and the capacitors 19 and 20 may be replaced by a single capacitor 28 which is connected to the high voltage windings of a pair of transformers 29 and 30 interposed between the capacitor and the opposite sides of the closed circuit. The operation of this modification of the apparatus is similar to that of the modifications previously described, and will be readily understood in view of the foregoing explanation.

The provision of resistors in the oscillatory circuit is not essential to satisfactory operation of the apparatus. As indicated by Fig. 6, the grid potential of the valve 13 may be derived from a grid circuit resistor 31 and a winding 33 which is inductively related to the winding 11 and the grid potential of the valve 14 may be derived from a resistor 34 and a winding 35 which is also inductively related to the winding 11. The operation of this arrangement is similar to that of those previously described and will be readily understood without detailed consideration.

Fig. 5 illustrates the application of the invention to the well known T type of connection. In this embodiment of the invention the connection of the direct current supply terminals is made through the valve 13, reactors 36 and 37, the valve 14 and the reactors 38 and 39, a capacitor 40 being connected between terminals located respectively at the junction between the reactors 31 and 32 and at the junction between the reactors 33 and 34. Current is supplied to the alternating current circuit 11 through a winding 41 which is inductively related to a winding connected in series with the capacitor 40. The operation of this type of apparatus is similar to that of the apparatus previously described and will be readily understood upon consideration of the full line and broken line arrows which indicate respectively the capacitor charging and discharge currents. Thus when current flows into the condenser 40 as indicated by the full line arrows, the electromotive force induced in the reactor 37 prevents the starting of current through the valve 14. As the potential across the valve 14 rises, more and more of the negative bias potential is neutralized by the resistor voltage drop until current is permitted to start and the anode potential of the tube 13 is reversed as explained in connection with the preceding modifications.

Fig. 7 illustrates an arrangement which differs from that of Fig. 5 in that the resistors 38 and 39 are omitted and a grid potential control scheme similar to that shown by Fig. 6 is utilized. The operation of this modification of the invention is similar to that of the modifications previously described.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of a pair of electric valves, an oscillatory circuit including reactors and capacitors connected alternately in series with one another and provided with opposed terminals, a direct current circuit connected between said opposed terminals through means including one of said electric valves, and means for subjecting the other of said electric valves successively to the resultant difference between the reactance and capacitor voltage drops of said oscillatory circuit and to the resultant sum of said voltage drops.

2. The combination of a pair of electric valves, an oscillatory circuit including reactors and capacitors interconnected with one another and provided with a pair of opposed terminals, a direct current circuit connected between said opposed terminals through means including one of said electric valves, and means for subjecting the other of said electric valves successively to the resultant difference between the reactance and capacitor voltage drops of said oscillatory circuit and to the resultant sum of said voltage drops.

3. The combination of a plurality of electric valves, an oscillatory circuit including reactors and capacitors connected alternately in series with one another and provided with pairs of opposed terminals, a direct current circuit connected between one of said pairs through means including one of said electric valves, and means including another of said electric valves connected between another of said pairs.

4. The combination of a plurality of electric valves, an oscillatory circuit including reactors and capacitors connected alternately in series with one another and provided with pairs of opposed terminals, a direct current circuit connected between one of said pairs through means including one of said electric valves, and means including another of said electric valves and a transformer winding connected between another pair of said terminals.

5. The combination of a plurality of electric valves, an oscillatory circuit including reactors and capacitors connected alternately in series with one another and provided with pairs of opposed terminals, a direct current circuit connected between one of said pairs through means including a transformer winding and one of said electric valves, means including the other of said electric valves and a transformer winding connected between another of said pairs, and an alternating current circuit coupled to said windings.

6. The combination of a pair of electric valves each provided with a control grid, an oscillatory circuit including pairs of resistance, reactance and capacity elements connected in series with one another, a direct current circuit connected through means including one of said valves to a terminal at the junction between one of said resistance elements and one of said capacity elements, means for subjecting the grid of said valve to a potential dependent on the voltage drop of said resistance element, means for connecting the other of said valves between terminals located respectively at the junction of the other of said capacity elements with one of said reactance elements and at the junction of the other of said resistance element with said first mentioned capacity element, and means for subjecting the grid of said other valve to a potential drop dependent on the voltage drop of said other resistance element.

In witness whereof, I have hereunto set my hand this 26th day of October, 1928.

CAMIL A. SABBAH.